United States Patent [19]

D'Silva

[11] Patent Number: 5,514,106
[45] Date of Patent: May 7, 1996

[54] BAG INCLUDING AN IDENTIFICATION SYSTEM INDICATIVE OF TREATMENT OF THE BAG

[75] Inventor: Edmund D. D'Silva, Vernon Hills, Ill.

[73] Assignee: Baxter International Inc., Deerfield, Ill.

[21] Appl. No.: 359,494

[22] Filed: Dec. 20, 1994

[51] Int. Cl.$^6$ .......................... A61B 19/00; G02B 05/30
[52] U.S. Cl. .................. 604/408; 128/DIG. 24; 359/483; 359/501
[58] Field of Search ............................ 604/403, 404, 604/408–410; 128/DIG. 24; 250/222.1; 359/501

[56] References Cited

U.S. PATENT DOCUMENTS

| | | | |
|---|---|---|---|
| 4,205,678 | 6/1980 | Adair | 128/283 |
| 4,303,184 | 12/1981 | Kloth | 224/32 |
| 4,866,282 | 9/1989 | Miripol et al. | |
| 4,896,901 | 1/1990 | Ekelund | 359/501 |
| 4,952,812 | 8/1990 | Miripol et al. | |
| 5,121,776 | 6/1992 | Kovach | 141/98 |
| 5,290,221 | 3/1994 | Wolf, Jr. et al. | |
| 5,314,421 | 5/1994 | Levenberger | 604/408 |

FOREIGN PATENT DOCUMENTS 2161453  1/1986  United Kingdom .................. 604/408

OTHER PUBLICATIONS

"Rad–Sure" Instant, Positive Visual Verification of Irradiation. Brochure by International Specialty Products.

*Primary Examiner*—Mary Beth Jones
*Assistant Examiner*—Dennis Ruhl
*Attorney, Agent, or Firm*—Robert M. Barrett; Bradford R. L. Price; Joseph B. Barrett

[57] ABSTRACT

A fluid-carrying bag (10) or container is provided as well as a method for forming such a bag. The bag (10) has identifiers (28a, 28b) indicating a status of the contents of the bag (10). To this end, a first layer and a second layer of preferably flexible material are sealed to form an interior (14) capable of holding a fluid. A flap (18) is provided wherein at least one hole (28a) may be punched through the flap (18) which is capable of detection by a sensor to indicate treatment of fluid within the interior (14) of the bag (10). One or more polarizing pieces (116a,b) may be provided between the fused layers (102, 104) in the flap (112) at a location through which the at least one hole (116a,b) is punched indicative of treatment of the fluid in the interior (108) of the bag (110).

19 Claims, 2 Drawing Sheets

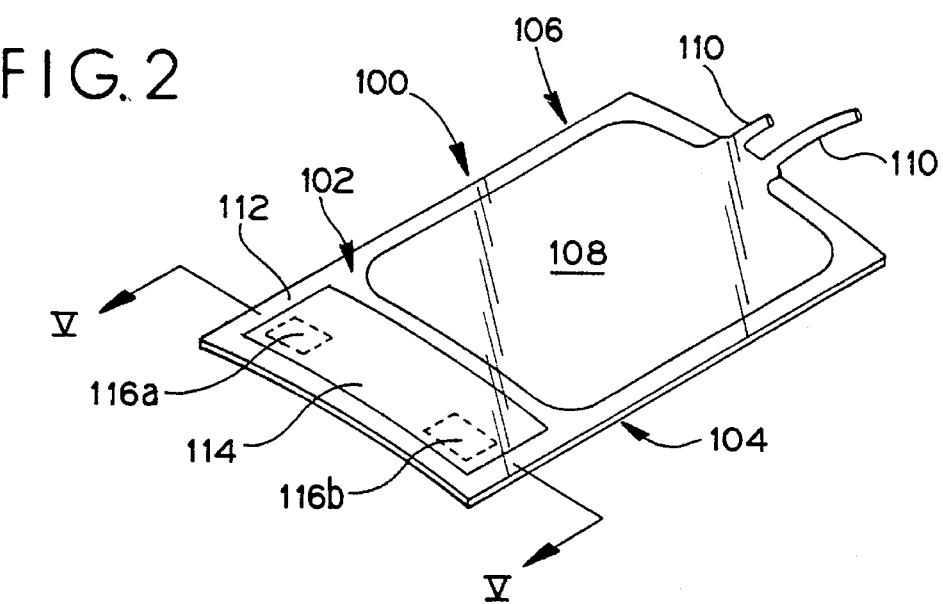
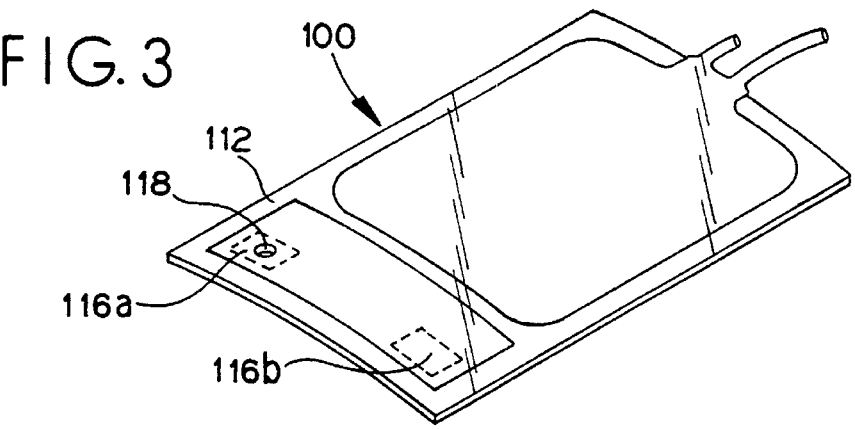
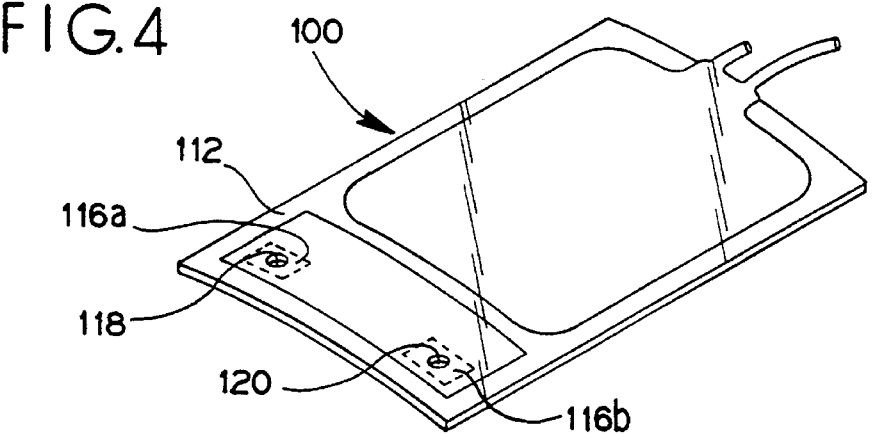

BAG INCLUDING AN IDENTIFICATION SYSTEM INDICATIVE OF TREATMENT OF THE BAG

BACKGROUND OF THE INVENTION

The present invention generally relates to a bag or container for holding a fluid therein. More specifically, the present invention relates to a disposable plastic bag or container having an interior for holding a mixture of methylene blue and a blood component, such as plasma. The bag has an identifying system to mark the bag to indicate whether the bag has been subjected to a process such as an illumination process used to treat the mixture, such as for sterilization.

It is, of course, generally known to provide containers having an interior for holding a variety of solutions, fluids, mixtures and the like. Such known bags and containers include a blood product, such as plasma. Viral inactivation is required following introduction of the blood product into the bag. To this end, the bag contains a chemical, such as methylene blue, which is mixed with the blood product. The mixture within the bag is then subjected to intense light of a prescribed wavelength, such as ultraviolet (UV), to photoactivate the chemicals in the bag which, in turn, perform the virucidal action on the blood product.

The photochemical reaction between the intense light and the product within the bag, however, does not produce any easily distinguishable sign indicating that the bag and the product therein has been subjected to a particular treatment. It is important to known whether such a bag and its contents, however, have been subjected to the illumination process. Visual inspection is virtually impossible following many treatment processes, particularly where distinguishing between a bag that has been illuminated and one that has not been illuminated is required.

Other systems are known to alleviate this problem and provide positive indication of the bag subjected to illumination. Such systems include application of a bar code identification to bags following subjection to the illumination, application of labels to illuminated bags, paint-marking the bag and/or use of a hot stamp to identify the bag. All of these known systems depend on cooperation and vigilance on the part of the user and can be easily defeated by the users or other individuals involved in the process. Furthermore, some of the systems, such as the bar code identification system, require additional individual illumination machines capable of communicating with a central computer to ensure that data was properly entered into a central data base.

A need, therefore, exists, to provide a bag and a method for forming a bag which provides positive identification that the bag has been subjected to a process, such as illumination, wherein the process is difficult to detect following completion of the process.

SUMMARY OF THE INVENTION

The present invention provides a fluid-carrying bag having an interior capable of holding a fluid and capable of identifying whether the bag has been subjected to a treatment process, such as illumination, following the treatment of the fluid within the bag. The present invention also provides a method for forming a bag having identifiers indicating that the bag has been subjected to a treatment process.

To this end, in an embodiment, the present invention provides a fluid-carrying bag having a first layer and a second layer sealed to the first layer to form an interior capable of holding a fluid wherein a portion of the first layer and the second layer is fused to form a flap wherein the flap has at least one hole punched therethrough capable of detection by a sensor to indicate treatment of the fluid in the interior.

In an embodiment, the fluid carrying bag has a first polarizing piece between the fused layers in the flap at a location through which the at least one hole is punched. The fluid-carrying bag may further include a second polarizing piece between the fused layers in the flap remotely situated from the first polarizing piece.

In an embodiment, an aperture is constructed and arranged to locate the bag in a specific orientation.

In an embodiment, the fluid carrying bag has a label identifying the fluid in the interior.

In an embodiment, the fluid carrying bag has a label identifying the fluid in the interior and is constructed and arranged to conceal the first polarizing piece between the fused layers in the flap.

In an embodiment, a port provides fluid communication with the interior of the fluid carrying bag.

In an embodiment, an aperture is constructed and arranged on a flap of the fluid-carrying bag.

In another embodiment of the present invention, a method is provided for forming a bag having identifiers indicating a status of the bag. The method comprises the steps of: providing a first layer; providing a second layer sealed to the first layer to form an interior capable of holding a fluid; providing an area in which the first layer and the second layer are fused together; and punching a hold through the area, the hole capable of sensing by a detector and providing an indication of the status of the bag.

In an embodiment, the method further comprises the step of providing a polarizing layer in the area in which the first layer and the second layer are fused together. A label may be attached to the bag to conceal the polarizing material.

In an embodiment, the method further comprises the step of providing an orienting aperture constructed and arranged to extend through the first layer and the second layer.

In an embodiment, the method further comprises the step of attaching a label to the bag to identify contents of the bag.

In an embodiment, the method further comprises the step of providing a port providing fluid communication with the interior of the bag.

In an embodiment, the method further comprises the step of providing an aperture in the area in which the first layer and the second layer are fused together to suspend the bag from the aperture.

In another embodiment of the present invention, a container is provided having an interior capable of carrying a fluid. The container has a first flexible layer and a second flexible layer capable of fusing to the first flexible layer to form the interior. A first polarizing piece is constructed and arranged between the first flexible layer and the second flexible layer.

In an embodiment, a flap is formed by fusing the first flexible layer to the second flexible layer.

In an embodiment, a label is constructed and arranged to conceal the first polarizing piece between the first flexible layer and the second flexible layer.

In an embodiment, an aperture is constructed and arranged to orient the container.

In an embodiment, a second polarizing piece is constructed and arranged between the first flexible layer and the second flexible layer wherein the first polarizing piece is remote from the second polarizing piece.

It is, therefore, an advantage of the present invention to provide a system and a method for holding a fluid within an interior of a bag.

Another advantage of the present invention is to provide a fluid-carrying bag or container and a method for forming a bag constructed and arranged to subject the bag to a treatment process, such as illumination.

Yet another advantage of the present invention is to provide a fluid-carrying bag or container and a method for forming a bag having layers fused together capable of punching and forming a hole through the layers.

A still further advantage of the present invention is to provide a fluid-carrying bag or container and a method for forming a bag including a means to identify when the bag or container has been subjected to treatment, such as illumination.

Moreover, an advantage of the present invention is to provide a fluid-carrying bag or container and a method for forming the bag that is substantially tamper-proof with respect to indication of treatment of the fluid within the bag.

And, another advantage of the present invention is to provide a fluid-carrying bag or container and a method for forming a bag that may be subjected to treatment, such as illumination, and may be easily processed to indicate the bag or container has been subjected to the treatment.

Additional features and advantages of the present invention are described in, and will be apparent from, the detailed description of the presently preferred embodiments and from the drawings.

BRIEF DESCRIPTION OF THE DRAWINGS

FIG. 2 illustrates a perspective view of another embodiment of a fluid-carrying bag or container with a second embodiment of identifiers on the container pursuant to the present invention.

FIG. 3 illustrates a perspective view of an embodiment of the fluid-carrying bag or container of the present invention as illustrated in FIG. 2 following a first step of a process for identifying treatment of contents of the bag or container.

FIG. 4 illustrates a perspective view of a fluid-carrying bag or container of the present invention as illustrated in FIGS. 2 and 3 following a second step of the process for identifying treatment of contents of the bag or container.

DETAILED DESCRIPTION OF THE PRESENTLY PREFERRED EMBODIMENTS

A fluid-carrying bag and a method for forming the same are provided having an identifier indicating whether the fluid or mixture contained within an interior of the bag has been subjected to treatment, such as, for example, illumination by ultraviolet (UV) radiation.

Figure 5:
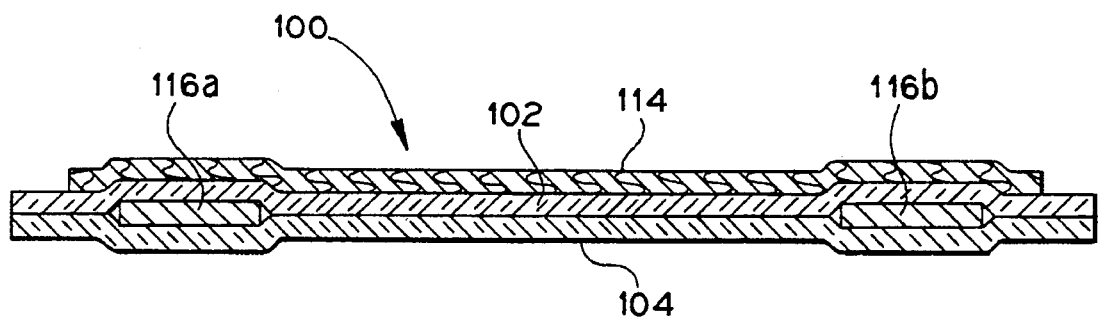
FIG. 5 illustrates a cross-sectional view taken generally along the line V—V of FIG. 2.
Figure 1:
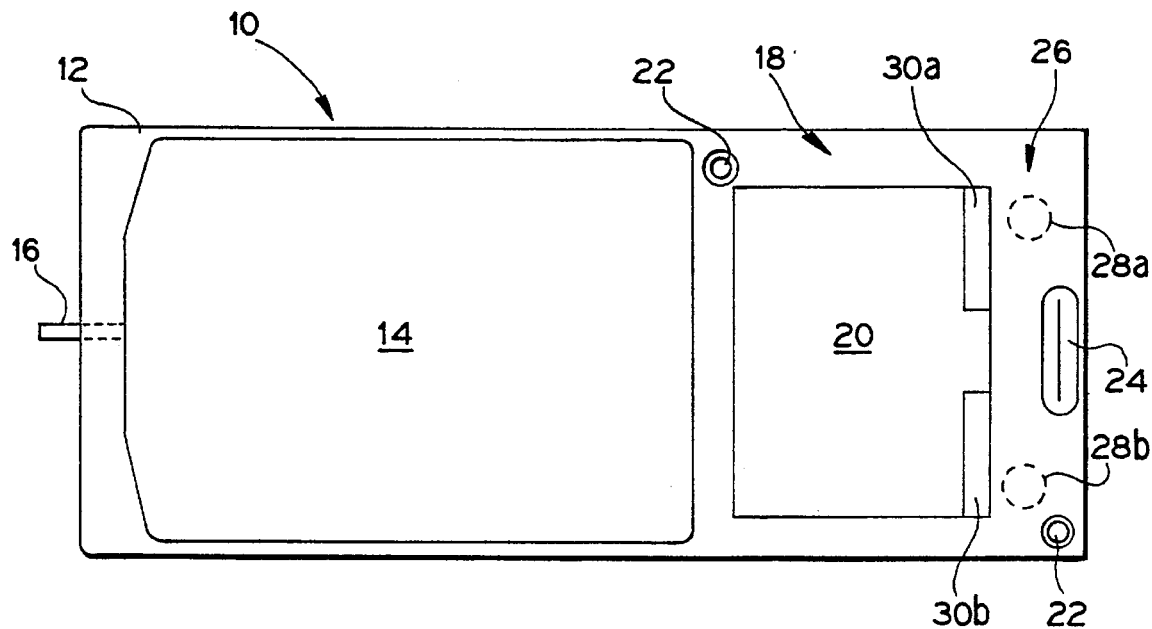
FIG. 1 illustrates a plan view of an embodiment of a fluid-carrying bag or container having a first embodiment of identifiers on the container pursuant to the present invention.

Referring now to the drawings, FIG. 1 illustrates an embodiment of a fluid-carrying container 10. The container 10 is formed from a top layer of preferably flexible material and a bottom layer of preferably flexible material fused together around a periphery 12 of the container 10. As a result, an interior 14 is formed capable of holding a fluid or mixture of fluids or the like, such as a blood component capable of mixture with a chemical, such as methylene blue. Fluid communication may be provided through the sealed periphery 12 and the interior 14 by at least one port 16.

At one end of the container 10 is a flap generally designated at 18. The flap 18 has the top layer and the bottom layer forming the container 10 substantially completely fused together. The container 10, preferably on the flap 18, may include a label 20 indicative of contents of the container 10. In addition, through the flap 18, one or more orienting apertures 22 may be provided.

Although two orienting apertures 22 are illustrated in FIG. 1, it should be understood that any number, including a single orienting aperture, may be provided to be implemented with a system for treating or processing the contents of the interior 14 of the container 10. Such a system is generally disclosed and described in commonly assigned and co-pending U.S. patent application Ser. No. 08/359,662, filed concurrently with the filing of this patent application, the disclosure of which is fully incorporated herein in its entirety.

In addition, a suspension aperture 24 may be provided through the flap 18. Further provided in the flap 18 is an area generally designated at 26 through which identifying holes 28a, 28b may be punched. The system for providing the punches 28a, 28b is generally disclosed and described in commonly assigned and copending U.S. patent application Ser. No. 08/359,664, filed concurrently herewith, the disclosure of which is incorporated in its entirety.

A first area 30a may be provided on the label 20 for text and an appropriate pointer, if desired, to describe the identifying hole 28a. Likewise, the second area 30b may be provided on the label 20 and reserved for text and an appropriate pointer, if desired, to describe the identifying hole 28b.

One of the identifying holes 28a or 28b is provided and designed to be independently punched at the start of the illumination process. The other hole, 28a or 28b, not originally punched at the start of the illumination process, is designed for punching at the completion of the illumination process. If the process is aborted, the second hole 28a or 28b is not punched and the operator can easily recognize such bags or containers as "defective."

In addition, when the user initiates an illumination process, a sensor provided in a system to be used with the container 10 can determine whether the hole 28a or 28b has already been punched. If it has been punched, the system determines that the container 10 in the device has already been illuminated. Instead of permitting a second dose of illumination, the system goes into a hazard state. The operator of the system can then observe whether the container 10 has one or both of the identifying holes 28a, 28b already punched. If only one hole 28a or 28b is punched indicating that the system has been started, the bag or container 10 must be discarded. If both of the holes 28a, 28b are punched in the container 10, evidence is provided that an attempt was made to give a second dose of illumination to the container 10.

FIGS. 2–5 illustrate another embodiment of a container 100 of the present invention wherein like numerals refer to like parts. The container 100 has a first or top layer 102 that is preferably flexible and fusible to a bottom, preferably flexible, layer 104. The top layer 102 and the bottom layer 104 are sealed around a periphery 106 of the container 100 forming an interior 108 capable of holding, for example, a fluid or mixture, such as a blood component mixed with a chemical, such as methylene blue.

Fluid communication with the interior 108 of the container 100 may be provided by one or more ports 110. The top portion of the container 100 is sealed to form a flap 112. The flap 112 may include a label 114 indicative of, for example, contents of the interior 108 of the container 100.

Between the fused top layer 102 and the bottom layer 104 are polarizing pieces 116a,b. One or more polarizing pieces may be arranged between the top layer 102 and the bottom layer 104 of the container 100. The polarizing pieces 116a,b, in a preferred embodiment, are situated beneath the label 114 to substantially conceal the same as the layers 102 and 104 are often transparent or translucent.

The polarizing pieces 116a,b condition light incident thereon. Accordingly, the container 100 with the polarizing pieces 116a,b therein is particularly applicable to the system and method disclosed and described in commonly assigned and co-pending U.S. patent application Ser. No. 08/359,662, filed concurrently herewith.

In a preferred embodiment, two of the polarizing pieces 116a,b are implemented in the container 100 of the present invention. Two detectable marks, therefore, signify the start and the end of a process of illumination.

As disclosed and described in co-pending U.S. patent application Ser. No. 08/359,662, a rotating polarizer is provided that detects a signal whose intensity varies sinusoidally as the polarizer rotates. When polarizing axes of the polarizing piece 116a or 116b and the rotating polarizers are at zero degrees to each other, the intensity of transmitted light is given by the equation:

$$I_s = I_o * T_d * T_h \cos \Theta$$

wherein $I_o$ is unhindered intensity of an emitter, $T_d$ is transmissivity of the polarizing piece 116a,b (about 0.9); and $T_h$ is transmissivity of the rotating polarizer (also about 0.9).

Under this condition, intensity detected by a sensor is about $0.81 I_o$. When the axis of the rotating polarizer is at 90° with respect to the axis of the polarizing piece 116a or b, the intensity detected by the sensor is zero as shown by the above equation (i.e. cosine 90° =0). Thus, an easily measurable variation in the intensity sensed by the sensor permits the process to proceed.

The process starts by a punch being driven towards a die by a mechanism, such as a motor or fluid cylinder. A hole 118 is thereby punched through the container 100 at the polarizing piece 116a of the container 100 as shown in FIG. 3.

When the process is completed, a similar hole 120 is punched through the container 100 at the polarizing piece 116b at a location remote from the hole 118 punched through the polarizing piece 116a as illustrated in FIGS. 3 and 4. Following punching of both of the holes 118 and 120, the operator is required to remove the container 100 from the system. If the operator does not do so, but tries to restart the process, the sensor sees a continuous high-intensity through the holes 118 and 120 punched in the flap 112, and, therefore, concludes that the container 100 has been processed. Suitable warning may be provided to an operator.

If the operator tries to defeat the system by putting a piece of tape or the like over one or both of the holes 118 and 120, the sensor will identify a constant signal at some low level, i.e. less than $I_s$. A conclusion that a malfunction exists in the system may be made, and the system can suitably warn the operator.

Suitable polarizing pieces 116a, 116b may be implemented by those skilled in the art. In addition, specific polarizers, quarter wave plates, reflective polarizers, certain liquids and several other optical materials may be implemented to accomplish the required signal conditioning detection in use of the system of the present invention. The use of such various components is well-known to persons skilled in the art and may be implemented as well by persons skilled in the art.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A fluid-carrying bag comprising:

a first layer;

a second layer sealed to the first layer to form an interior capable of holding a fluid wherein a portion of the first layer and the second layer is fused to form a flap wherein the flap has at least one hole punched therethrough capable of detection by a sensor to indicate treatment of the fluid in the interior; and a first polarizing piece between the fused layers in the flap at a location through which the at least one hole is punched.

2. The fluid-carrying bag of claim 1 further comprising:

a second polarizing piece between the fused layers in the flap remotely situated from the first polarizing piece.

3. The fluid carrying bag of claim 1 further comprising:

an aperture constructed and arranged to locate the bag in a specific orientation.

4. The fluid-carrying bag of claim 1 further comprising:

a label identifying the fluid in the interior.

5. The fluid-carrying bag of claim 1 further comprising:

a label identifying the fluid in the interior and constructed and arranged to conceal the first polarizing piece between the fused layers in the flap.

6. The fluid-carrying bag of claim 1 further comprising:

a port providing fluid communication with the interior.

7. The fluid-carrying bag of claim 1 further comprising:

an aperture constructed and arranged on the flap.

8. A method for forming a bag having identifiers indicating a status of the bag, the method comprising the steps of:

providing a first layer;

providing a second layer sealed to the first layer to form an interior capable of holding a fluid;

providing an area in which the first layer and the second layer are fused together;

punching a hole through the area, the hole capable of sensing by a detector and providing an indication of the status of the bag: and providing a polarizing layer in the area in which the first layer and the second layer are fused together.

9. The method of claim 8 further comprising the step of:

providing a polarizing layer in the area in which the first layer and the second layer are fused together.

10. The method of claim 8 further comprising the step of:

providing an orienting aperture constructed and arranged to extend through the first layer and the second layer.

11. The method of claim 8 further comprising the step of:

attaching a label to the bag to identify contents of the bag.

12. The method of claim 8 further comprising the step of:

providing a port providing fluid communication with the interior of the bag.

13. The method of claim 8 further comprising the step of:

attaching a label to the bag, the label constructed and arranged to conceal the polarizing layer.

14. The method of claim 8 further comprising the step of:

providing an aperture in the area in which the first layer and the second layer are fused together to suspend the bag from the aperture.

15. A container having an interior capable of carrying a fluid, the container comprising:

a first flexible layer;

a second flexible layer fused to the first flexible layer to form the interior; and a first polarizing piece constructed and arranged between the first flexible layer and the second flexible layer remote from the interior.

16. The container of claim 15 further comprising:

a flap formed by fusing the first flexible layer to the second flexible layer.

17. The container of claim 15 further comprising:

a label constructed and arranged to conceal the first polarizing piece.

18. The container of claim 15 further comprising:

an aperture constructed and arranged to orient the container.

19. The container of claim 15 further comprising:

a second polarizing piece constructed and arranged between the first flexible layer and the second flexible layer wherein the first polarizing piece is remote from the second polarizing piece.

* * * * *